United States Patent
Liu

(10) Patent No.: US 9,451,311 B2
(45) Date of Patent: Sep. 20, 2016

(54) GENERIC REMOTE CONTROLLER

(75) Inventor: Yue Liu, Milpitas, CA (US)

(73) Assignee: Ricoh Company, Ltd., Tokyo (JP)

( * ) Notice: Subject to any disclaimer, the term of this patent is extended or adjusted under 35 U.S.C. 154(b) by 577 days.

(21) Appl. No.: 12/973,761

(22) Filed: Dec. 20, 2010

(65) Prior Publication Data

US 2012/0154130 A1 Jun. 21, 2012

(51) Int. Cl.
*H04N 21/41* (2011.01)
*H04N 21/422* (2011.01)
*H04N 21/4223* (2011.01)
*H04N 21/443* (2011.01)

(52) U.S. Cl.
CPC ...... *H04N 21/4126* (2013.01); *H04N 21/4223* (2013.01); *H04N 21/42226* (2013.01); *H04N 21/4432* (2013.01); *G05B 2219/23363* (2013.01)

(58) Field of Classification Search
CPC ............ G06Q 30/02; H04N 21/4622; H04N 5/4401; H04N 1/00127; H04N 21/812; H04N 21/4126; H04L 67/02
USPC ............... 340/1.1, 12.1, 12.15, 12.22–12.23, 340/12.3, 12.5, 12.24–13.3
See application file for complete search history.

(56) References Cited

U.S. PATENT DOCUMENTS

| | | | |
|---|---|---|---|
| 6,225,938 B1 * | 5/2001 | Hayes | G11B 15/023 235/462.45 |
| 6,489,567 B2 * | 12/2002 | Zachrai | 174/149 B |
| 6,498,567 B1 * | 12/2002 | Grefenstette | G08C 17/02 340/10.4 |
| 6,938,101 B2 * | 8/2005 | Hayes | G06F 1/1626 348/E5.103 |
| 7,609,406 B2 * | 10/2009 | Roth | B41J 3/36 235/375 |
| 2002/0152241 A1 | 10/2002 | Hepworth et al. | |
| 2003/0197887 A1 * | 10/2003 | Shenoy | G06F 3/1205 358/1.15 |
| 2005/0279833 A1 | 12/2005 | Tanaka | |
| 2008/0110991 A1 | 5/2008 | Bedingfield | |

(Continued)

FOREIGN PATENT DOCUMENTS

| | | |
|---|---|---|
| EP | 0566516 A1 | 10/1993 |
| EP | 1021035 A1 | 7/2000 |
| WO | WO 02/33496 A1 | 4/2002 |

(Continued)

OTHER PUBLICATIONS

European Patent Office, "Search Report" in application No. 2008/0110991, dated May 20, 2014, 6 pages.

(Continued)

*Primary Examiner* — James Yang
(74) *Attorney, Agent, or Firm* — Hickman Palermo Becker Bingham LLP

(57) ABSTRACT

Techniques are provided for a handheld device, such as a smart phone, to obtain device configuration data of a controlled device via machine-readable media, such as a two-dimensional barcode. The device configuration data may be used to allow a user to select one or more features reflected in the device configuration data and supported by the controlled device. The handheld device may obtain device configuration data of multiple controlled devices and, based on the device configuration data, may allow a user to control the multiple controlled devices using the handheld device. In a related technique, a computing device obtains printer driver data of a printing device via machine-readable media. The computing device decodes information encoded in the machine-readable media in order to install a printer driver for the printing device.

23 Claims, 10 Drawing Sheets

(56) References Cited

U.S. PATENT DOCUMENTS

2010/0163613 A1 7/2010 Bucher et al.
2011/0140844 A1* 6/2011 McGuire ............... G09F 3/0291
340/6.1

FOREIGN PATENT DOCUMENTS

| WO | WO 0233496 A1 * | 4/2002 |
| WO | WO 2006/052074 A1 | 5/2006 |
| WO | WO2006/134585 A1 | 12/2006 |

OTHER PUBLICATIONS

European Patent Office, "Search Report" in application No. 11192497.3-1905, dated Jul. 17, 2014, 11 pages.

* cited by examiner

GENERIC REMOTE CONTROLLER

FIELD OF THE INVENTION

The present invention relates to obtaining and using a generic controller on a handheld device to control one or more devices. The present invention also relates to generic way to obtaining, creating, and installing a printer driver.

BACKGROUND

Consumers of electronic devices are familiar with the problem of learning and maintaining a remote controller for each purchased electronic device. For example, a user may have a remote controller for a television, a remote controller for a DVR, a remote controller for a radio, a remote controller for a CD player, a remote controller for a DVD player, a remote controller for a VCR (video cassette recorder), and a remote controller for one or more light switches.

To alleviate the problem of learning and maintaining a multiplicity of remote controllers for various electronic devices in a home or business setting, universal remote controllers have been developed. A universal remote controller (or simply "universal remote") is a controller that can be programmed to control multiple electronic devices. However, current universal remotes suffer from a number of drawbacks. For example, in order to program a universal remote, a user must locate and examine a remote control code table, which typically contains codes for each manufacturer and device type. Frequently, a user must try to enter a number of different codes into the universal controller before a match is found.

Another drawback is that some universal remotes do not support the full functionality of a particular device as the original remote controller would have. Furthermore, even if the universal remote did support the full functionality of a particular device, the layout of the buttons (or keys) on the universal remote might not be as intuitive as the original remote controller.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for controlling a device. At a controlling device, a digital representation of data that is encoded in machine-readable media is analyzed to determine device configuration data associated with a controlled device that supports a plurality of features. The device configuration data indicates the plurality of features and a plurality of control codes. At the controlling device, input that selects a particular feature of the plurality of features is received. In response to receiving the input and based on the particular feature, a particular control code of the plurality of controls codes is identified. The particular control code is then sent from the controlling device to the controlled device.

At a computing device, a digital representation of data encoded on machine-readable media is analyzed to determine printing device configuration data associated with a printing device that supports a plurality of features. The printing device configuration data indicates the plurality of features. At the computing device and based on the printing device configuration data, a command to install a printer driver associated with the printing device is generated. The printer driver is caused to be installed on the computing device by submitting the command to a component of the computing device.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A technique is provided for a handheld device, such as a smart phone, to obtain device configuration data, of a controlled device, that is encoded in machine-readable media, such as a two-dimensional barcode. The handheld device may obtain device configuration data of multiple controlled devices and, based on the device configuration data, allow a user to control the multiple controlled devices using the handheld device. Thus, the handheld device may be used as a generic controller of multiple controlled devices.

In a related technique, a computing device obtains printer driver data of a printing device via machine-readable media, such as a two-dimensional barcode. The computing device decodes information encoded in the machine-readable media in order to install a printer driver, encoded in the machine-readable media, for the printing device.

Class Diagram

Figure 1:
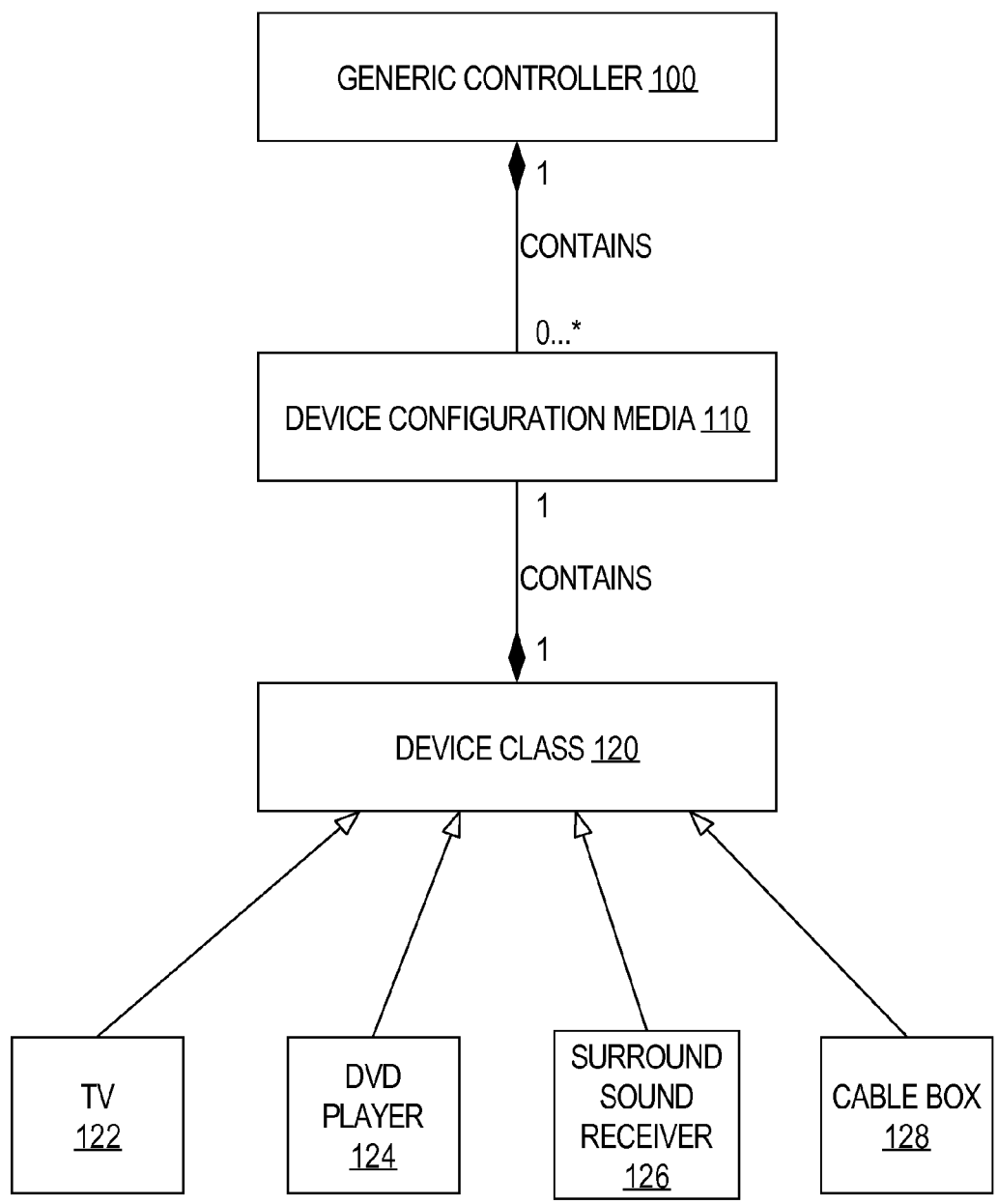
FIG. 1 is a diagram that depicts relationships between a generic controller, device configuration media, and a device class, according to an embodiment of the invention.

FIG. 1 is a diagram that depicts relationships between a generic controller 100, device configuration media 110, and a device class 120, according to an embodiment of the invention. Generic controller 100 is "generic" in that it can be used to control multiple devices. Generic controller 100 contains zero or more device configuration media 110, i.e., corresponding to zero or more controlled devices.

Each device configuration media 110 specifies the device's device class 120. Device class 120 may correspond to devices of a certain capability. For example, device class 120 may correspond to infrared (IR) devices or to ultra high frequency (UHF) devices. An IR device is a device that is configured to receive and process IR signals transmitted to the IR device. Similarly, a UHF device is a device that is configured to receive and process UHF signals transmitted to the UHF device.

Based on the relationship between generic controller 100 and device class 120 via device configuration media 110, generic controller 100 corresponds to the class indicated by device class 120. For example, if device class 120 corresponds to IR devices, then generic controller 100 is for IR devices.

Device class 120 corresponds to multiple types of devices, such as TV 122, DVD Player 124, Surround Sound Receiver 126, and Cable Box 128. Other devices may be of the same type (e.g., a TV) as these example devices, but are of a different class. For example, another type of TV may be a UHF-enabled TV (rather than IR-enabled) and another type of DVD player may be a UHF-enabled DVD player (rather than IR-enabled).

Generic Device Controller

Figure 2:
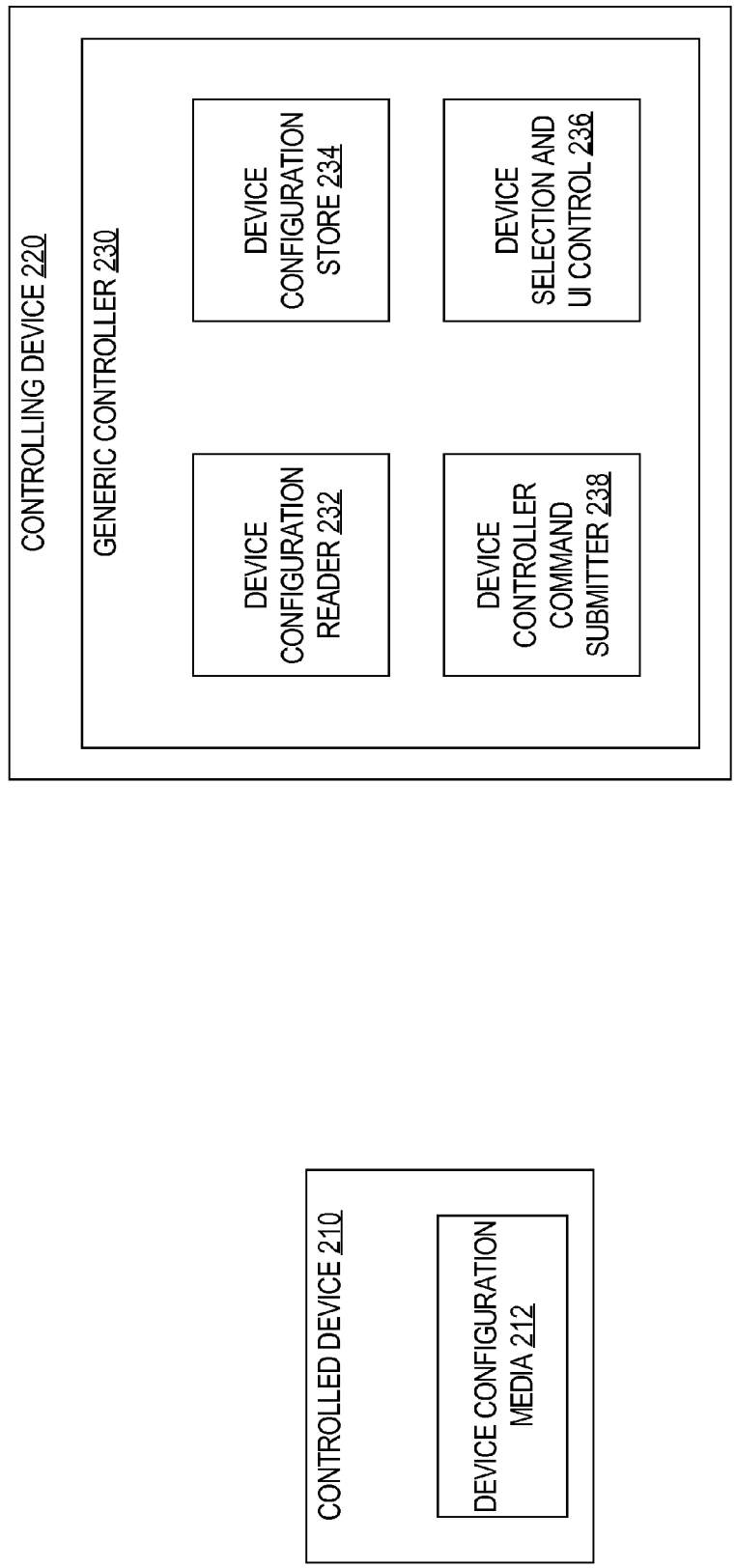
FIG. 2 is a block diagram that depicts components of a controlled device and a controlling device, according to an embodiment of the invention.

FIG. 2 is a block diagram that depicts components of a controlled device 210 and a controlling device 220, according to an embodiment of the invention. Controlled device 210 is associated with device configuration media 212. Device configuration media 212 is any media upon which device configuration data of the controlled device 210 is stored or encoded.

In an embodiment, device configuration media 212 is machine-readable media. Non-limiting examples of machine-readable media may be a printed image, such as an image that is printed on a device or on paper, or an image that is displayed on a screen of a device. An example of an image is a jpeg image or a png image. Another example of an image is a two-dimensional barcode. A two-dimensional barcode or jpeg image may be printed on, for example, packaging that was used to pack controlled device 210, a user manual of controlled device 210, or on controlled device 210 itself.

There are numerous examples of two-dimensional barcodes. Non-limiting examples of two-dimensional barcodes include Quick Response (QR) code, Data Matrix, and Aztec Matrix. A two-dimensional barcode may comprise black modules arranged in a square pattern on a white background. A two-dimensional barcode has more data representation capability relative to a linear or one-dimensional barcode. For example, a typical two-dimensional barcode can encode approximately 3 KB of data or about 4,000 characters. Although typically only black and white, a two-dimensional barcode may be in color, in which case the barcode can encode significantly more data.

The information encoded in the barcode may be text, URL, or other data. In an embodiment, the information encoded in the two-dimensional barcode is (a) a set of features supported by the controlled device and (b) the control codes that correspond to the set of features. This encoded information may be formatted in numerous ways. For example, this encoded information may be formatted in XML.

In an alternative embodiment, the information encoded in the two-dimensional barcode is a URL (Uniform Resource Locator) that identifies where device configuration data for the controlled device may be retrieved. Thus, generic controller 230, after detecting the URL encoded in the two-dimensional barcode, retrieves the device configuration data from a location identified by the URL.

Controlling device 220 is a handheld device that includes a display. Non-limiting examples of controlling device 220 include a mobile phone with a camera, a "smartphone," and a laptop computer. The display may be a touch screen display where a user may provide input by touching areas of the display that correspond to buttons or other graphical elements.

Controlling device 220 comprises generic controller 230, which may be implemented in software, hardware, or any combination of hardware and software. In FIG. 2, generic controller 230 comprises at least four components: a device configuration reader 232, a device configuration store 234, a device selection and UI (user interface) control 236, and a device controller command submitter 238. Related embodiments may include more or less components. Each component of generic controller 230 may be implemented as a module or a separate process. Embodiments are not limited to any particular implementation.

Device configuration reader 232 analyzes a digital representation of data that is encoded in device configuration media 212 to decipher or decode the data encoded in device configuration media 212 to generate device configuration data (e.g., data 300 in FIG. 3, described in more detail herein) of controlled device 210. Device configuration reader 232 stores the device configuration data in device configuration store 234. Device configuration store 234 may store device configurations for multiple controlled devices, including controlled device 210.

Figure 4:
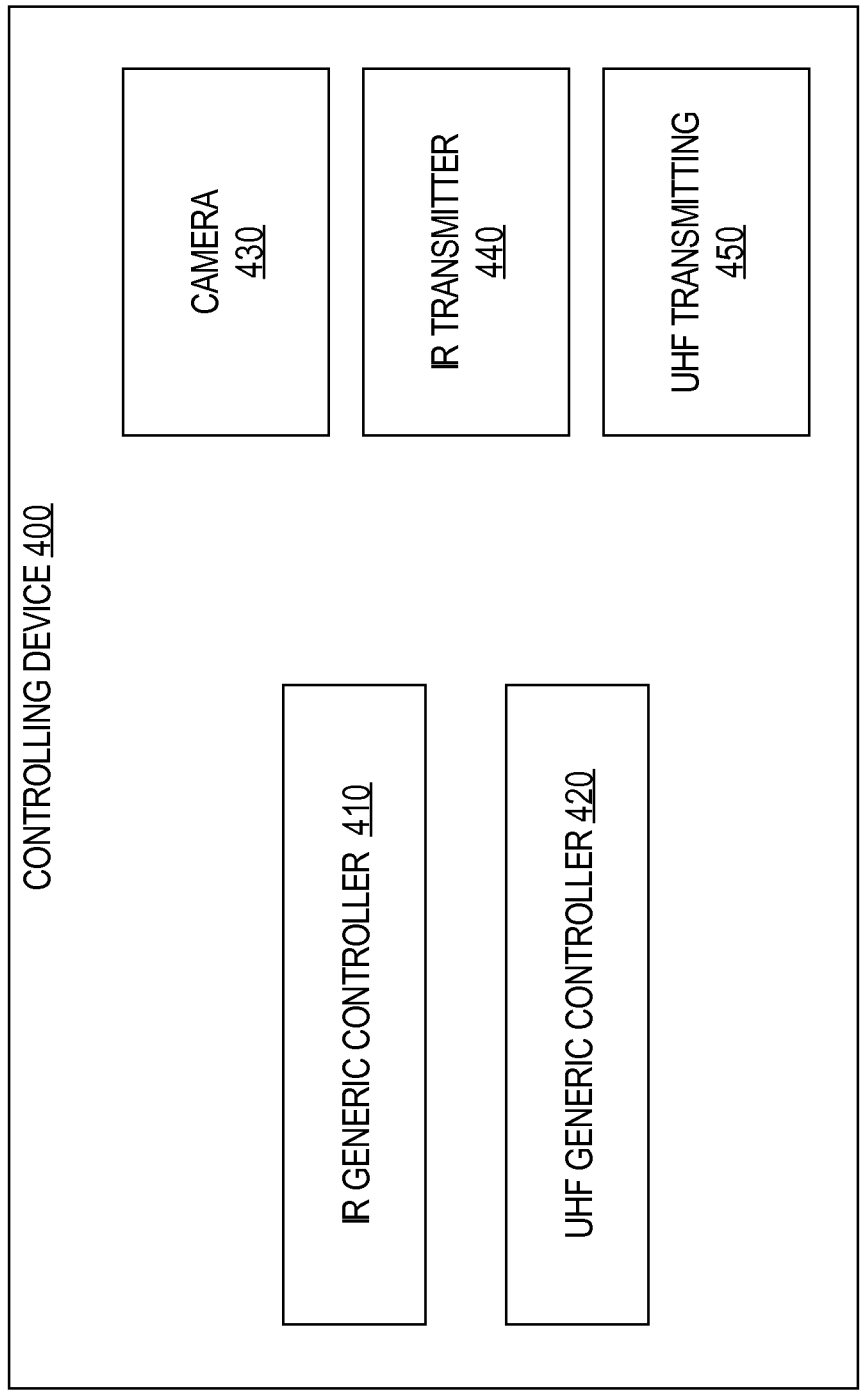
FIG. 4 is a block diagram that depicts components of a handheld device that acts as a controlling device, according to an embodiment of the invention.

In an embodiment, the controlling device 220 includes a camera (depicted in FIG. 4 described herein). The camera is used to take a picture of device configuration media 212 (e.g., two-dimensional barcode). The digital image generated by the camera is input to device configuration reader 232, which is configured to analyze the digital image to decipher, or decode, the information encoded in device configuration media 212. As indicated above, the result of decoding the information encoded in device configuration media 212 is device configuration data.

Device Configuration Data

Figure 3:
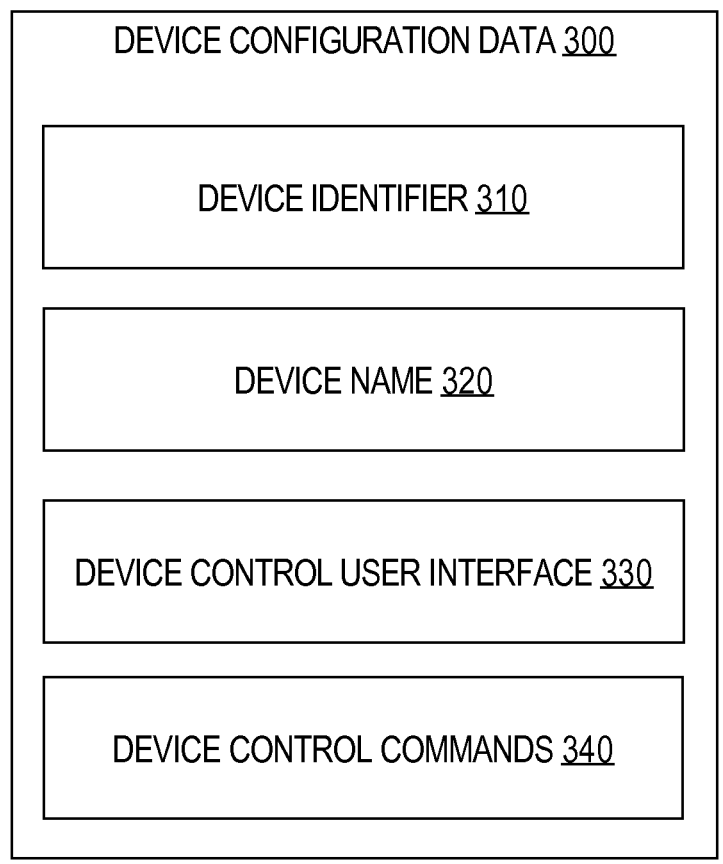
FIG. 3 is a block diagram that depicts various types of device configuration data, according to an embodiment of the invention.

FIG. 3 is a block diagram that depicts various types of device configuration data 300, according to an embodiment of the invention. In this depicted example, device configuration data 300 comprises a device identifier 310, a device name 320, a device control user interface 330, and device control commands 340. Device identifier 310 may uniquely identify controlled device 210 relative to, for example, all devices or a class of devices.

Device name 320 may be provided based on user input for the convenience of the user of generic controller 230 to easily distinguish controlled device 210 relative to any other devices that are controlled by generic controller 230. For example, device name 320 provided by a user for controlled device 210 may be "TV remote" while device identifier 310 of controlled device 210 may be "dvc809088113x."

Device control user interface 330 is data that, when processed by generic controller 230, is used to generate a user interface on a display (not shown) of controlling device 220. The generated user interface may include a button for each control feature of controlled device 210. Such features vary depending on the type of controlled device 210. For example, the feature set of a TV is different than the feature set of a VCR and the feature set of a radio device. For example, the feature set of a TV may include a feature to increase the volume and a feature to decrease the volume. The feature set of a VCR may only include the features of play, stop, rewind, forward, pause, and eject, without any features related to volume. Thus, the user interface (a) generated from the device configuration data of a VCR and (b) displayed on a display of controlling device 220 may only include six buttons: one for play, one for stop, one for rewind, one for forward, one for pause, and one for eject.

As another example of a feature set, controlled device 210 may be a radio device where the feature set includes features for increasing and decreasing the volume, a feature to switch between AM and FM, a feature to seek through higher frequencies, a feature to seek through lower frequencies, a feature to turn the radio on and off, and features to allow for preset radio stations (e.g., identified by numbers 1-10).

Device control commands 340 comprise the set of control codes, one for each feature of controlled device 210 and, thus, one for each button or selectable option displayed on the display of controlling device 220. Device control commands 340 may comprise a set of mappings, where each mapping maps a feature of controlled device 210 to a particular control code. For example, a control code for the play feature of a VCR may be the set of bits '011' encoded in a signal that controlling device 220 may transmit at a particular frequency, while the control code for the stop feature of the VCR may the set of bits '010' encoded in a signal that controlling device 220 may transmit at the particular frequency.

Also, the specific frequency at which control codes are transmitted by controlling device 220 may be encoded on device configuration media 212 (such as a label) and indicated in device configuration data 300.

One significant difference between a generic remote controller and a remote controller that is dedicated to or manufactured for (and usually packaged with) controlled device 210 is that the dedicated remote controller is pre-configured or manufactured to include the control codes for controlled device 210. Thus, no device configuration media (such as media 212) is necessary. Also, a dedicated remote controller would not have a built-in camera. Nor would a dedicated remote controller require functionality (such as reader 232) to analyze and decode information in order to identify control codes, for controlled device 210, encoded in the information.

As an alternative to device configuration media 212, such as a printed label on which a two-dimensional barcode is printed, each controlled device (including controlled device 210) might be manufactured to have built-in wireless discovery capability in order to support the transfer of features and corresponding control codes to a generic remote controller. However, requiring controlled devices to have this capability is much more expensive than requiring each controlled device to have device configuration media, such as a small printed label that encodes all the appropriate device configuration data for a remote controller. Also, in the printing device context, it may be difficult in some situations to locate a printing device with the advertised feature. For example, it may be difficult to physically locate a discovered printing device in a large office building.

Multiple Modes of Communication

In an embodiment, controlling device 220 is configured to communicate with multiple controlled devices that are configured to communicate with remote controllers via different modes of communication. For example, one set of controlled devices may be configured to receive and process infrared (IR) signals while another set of controlled devices may be configured to receive and process ultra high frequency (UHF) signals.

Thus, according to FIG. 4, a controlling device 400 comprises two generic controllers: IR generic controller 410 and UHF generic controller 420. Each of IR generic controller 410 and UHF generic controller 420 may include the same components as generic controller 230 described herein. FIG. 4 also depicts controlling device 400 as comprising two types of transmitters, one for each mode of communication: an IR transmitter 440, and a UHF transmitter 450. Although not found on most (if not all) mobile phones, future mobile phones may be produced that include one or more of such transmitters.

Controlling device 400 also comprises a camera 430. Both IR controller 410 and UHF controller 420 communicate with camera 430 to cause camera 430 to take a picture, i.e., to generate one or more digital images. After the appropriate device configuration data is generated from one or more digital images captured by camera 430 and a user interface based on the device configuration data is generated and displayed, input is received, where the input selects a button that corresponds to a particular feature of a controlled device. In response to the selection, the appropriate generic controller (e.g., 410 or 420) (a) identifies the control code that corresponds to the selected button and (b) sends the control code to the appropriate transmitter (e.g., 440 or 450).

For example, if a user desires to control a particular IR device (e.g., a DVD player or TV), then the user selects, from a list displayed on the user's handheld device, an option that identifies the particular IR device. In response to the selection, IR generic controller 410 generates a user interface that corresponds to the particular IR device and causes the user interface to be displayed on a screen of the user's handheld device. The user interface comprises a number of buttons that correspond to a set of features supported by the particular IR device. The user then selects a button. IR generic controller 410 determines the control code that corresponds to the selected button. IR generic controller 410 sends the control code to IR transmitter 440, which, in turn, transmits the control code. If controlled device 210 is in range of IR transmitter 440 when transmitter 440 transmits the control code, then controlled device 210 should receive the control code and perform the function pertaining to the control code.

A similar process is performed if the controlled device is a UHF device (i.e., a device that is configured to receive and process UHF signals from a remote controller). The differences include (1) that the UHF controller 420 performs the steps that the IR generic controller 410 would perform if the controlled device is an IR device and (2) that UHF transmitter 450 performs the steps that the IR transmitter 440 would perform if the controlled device is an IR device.

Generic Controller Setup

Figure 5:
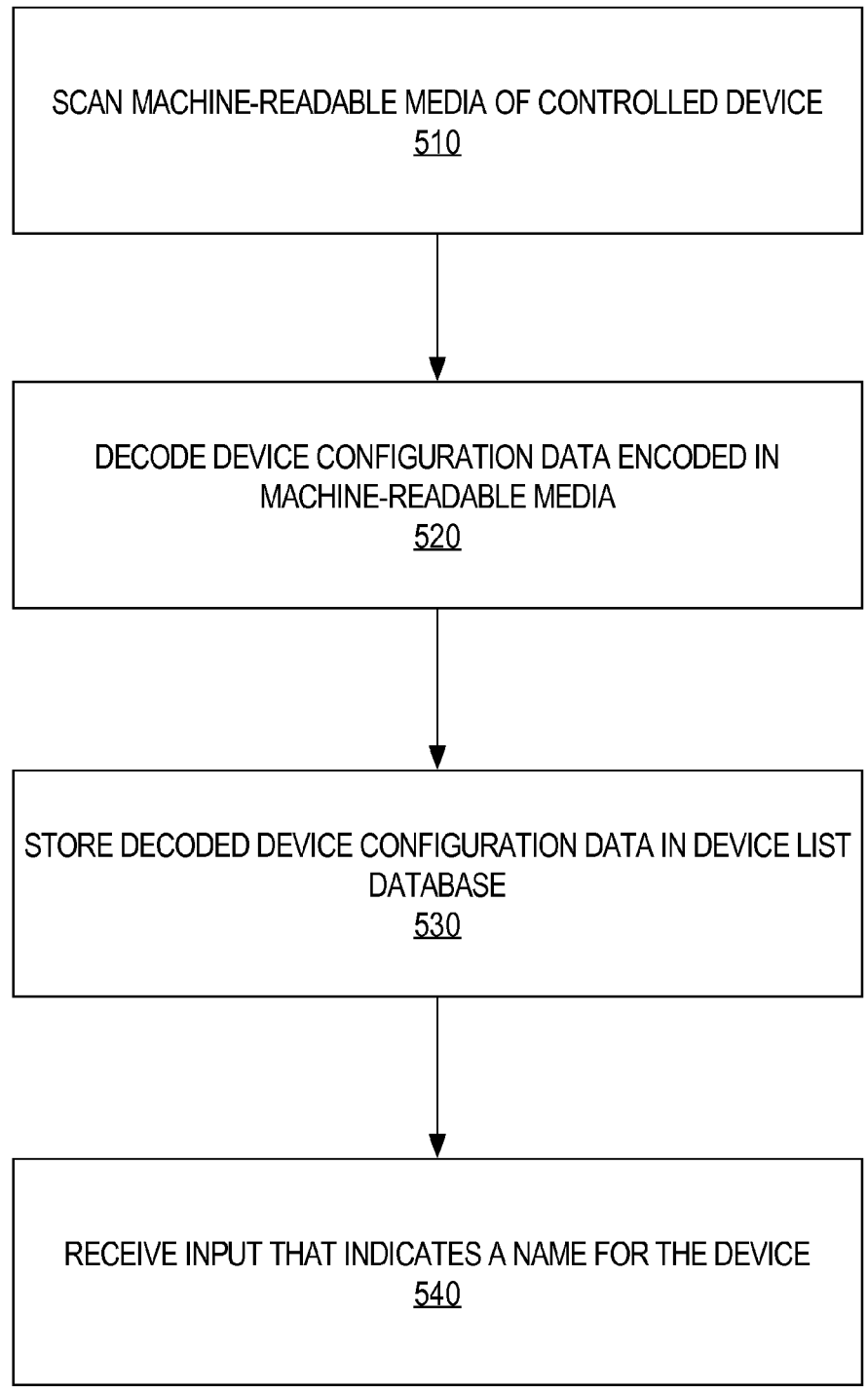
FIG. 5 is a flow diagram that depicts a process for obtaining device configuration data, according to an embodiment of the invention.

FIG. 5 is a flow diagram that depicts a process for obtaining device configuration data, according to an embodiment of the invention. FIG. 5 is described with reference to elements depicted in FIG. 2.

In step 510, machine-readable media (e.g., a label with a barcode) of controlled device 210 is scanned. This step may be performed by generic controller 230 causing a camera (not shown) on controlling device 220 to take a picture of the machine-readable media, e.g., on controlled device 210 (or on packaging of controlled device 210). The digital image generated by the camera taking the picture is input to device configuration reader 232.

In step 520, device configuration data encoded in the barcode is decoded. This step may be performed by device configuration reader 232 analyzing the digital image generated by the camera.

In step 530, the decoded device configuration data is stored in a device list database. This step may be performed by device configuration reader 232 storing the device configuration data in device configuration store 234.

In step 540, input is received that indicates a name for controlled device 210. This step may be performed by generic controller 230 detecting input received through (a) a user interface displayed on a screen of controlling device 220, (b) user selection of certain keys on a keyboard of controlling device 220, or (c) voice recognition software executing on controlling device 220, whether as part of generic controller 230 or a separate hardware/software component. Generic controller 230 stores the name in association with the device configuration data of controlled device 210. Step 540 may be performed before or after any of the other steps of FIG. 5 or may not be performed at all. For example, a device name for controlled device 210 may be encoded in the barcode scanned in step 510. Generic controller 230 automatically stores this device name in association with the device configuration data of controlled device 210.

Using the Generic Controller

Figure 6:
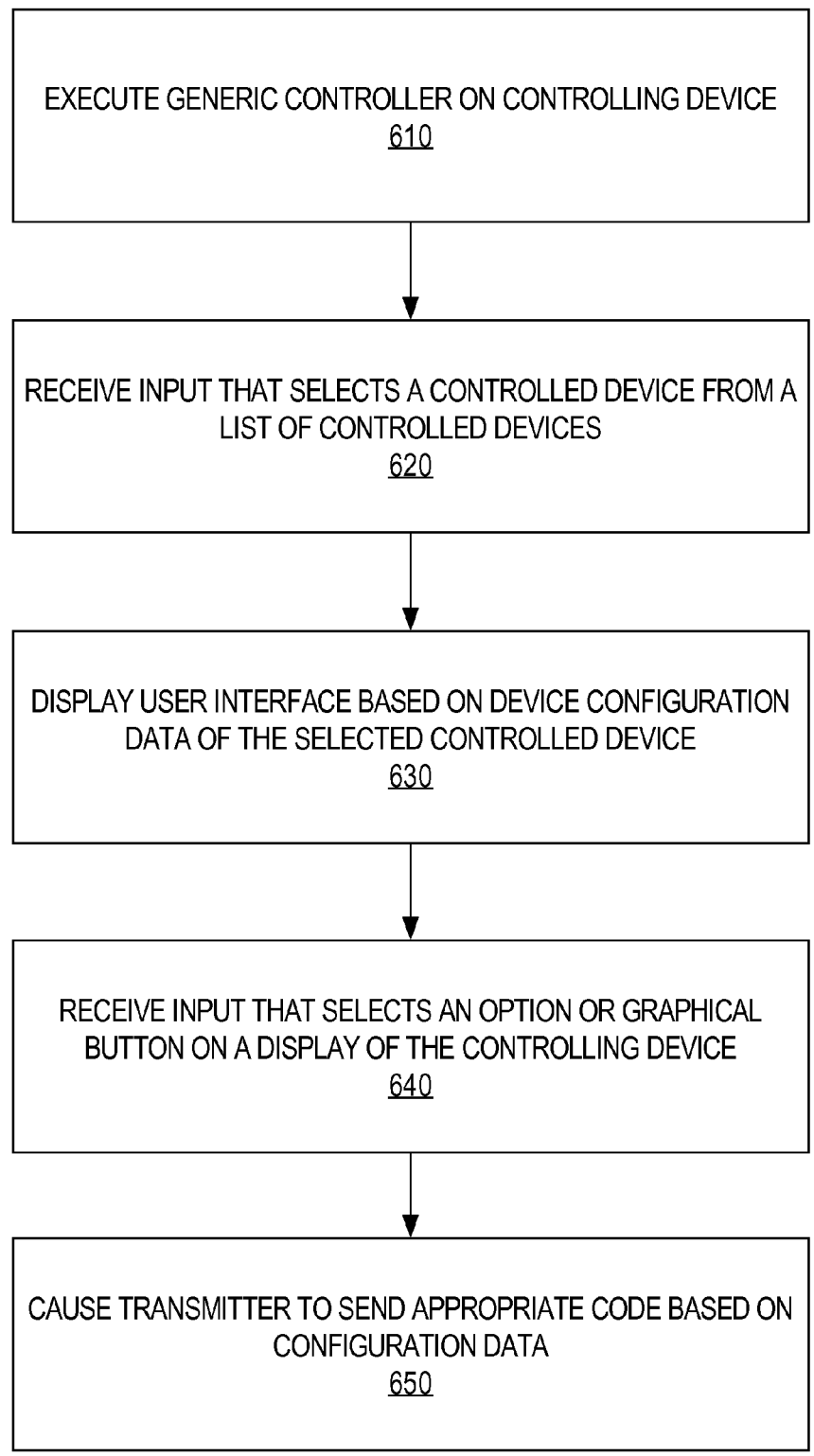
FIG. 6 is a flow diagram that depicts a process for employing device configuration data, according to an embodiment of the invention.

FIG. 6 is a flow diagram that depicts a process for employing device configuration data, according to an embodiment of the invention. FIG. 6 is described with reference to elements depicted in FIG. 2.

In step 610, generic controller 230 is executed on controlling device 220. This step may be performed in response to input from a user, such as a user selecting an icon displayed on a screen (not shown) of controlling device 220 or a user selecting a key or set of keys on a keyboard (not shown) of controlling device 220.

In step 620, input is received that selects, from a list of controlled devices, data that identifies a particular controlled device. The list of controlled devices may be generated and displayed in response to step 610 or in response to input that instructs generic controller 230 to generate the list.

In step 630, a user interface, based on the device configuration data of the selected controlled device, is generated and displayed on a screen of controlling device 220. This step may be performed by device selection and UI control 236 of generic controller 230. The user interface includes graphical elements that correspond to all (or at least a subset) of the features supported by the particular controlled device.

In step 640, input is received that selects a graphical element that corresponds to one of the features supported by the particular controlled device.

In step 650, in response to the input received in 640, generic controller 230 causes a transmitter (e.g., an IR transmitter or a UHF transmitter) to send a control code that corresponds to the feature selected in step 640. This step may be performed by device controller command submitter 238. Step 650 may further comprise, prior to causing the transmitter sending the control code, generic controller 230 identifying the control code in a mapping (e.g., device control commands 340) that maps (a) each feature, of the particular controlled device, reflected in the device configuration data to (b) a different control code.

UHF Device Setup

Figure 7A:
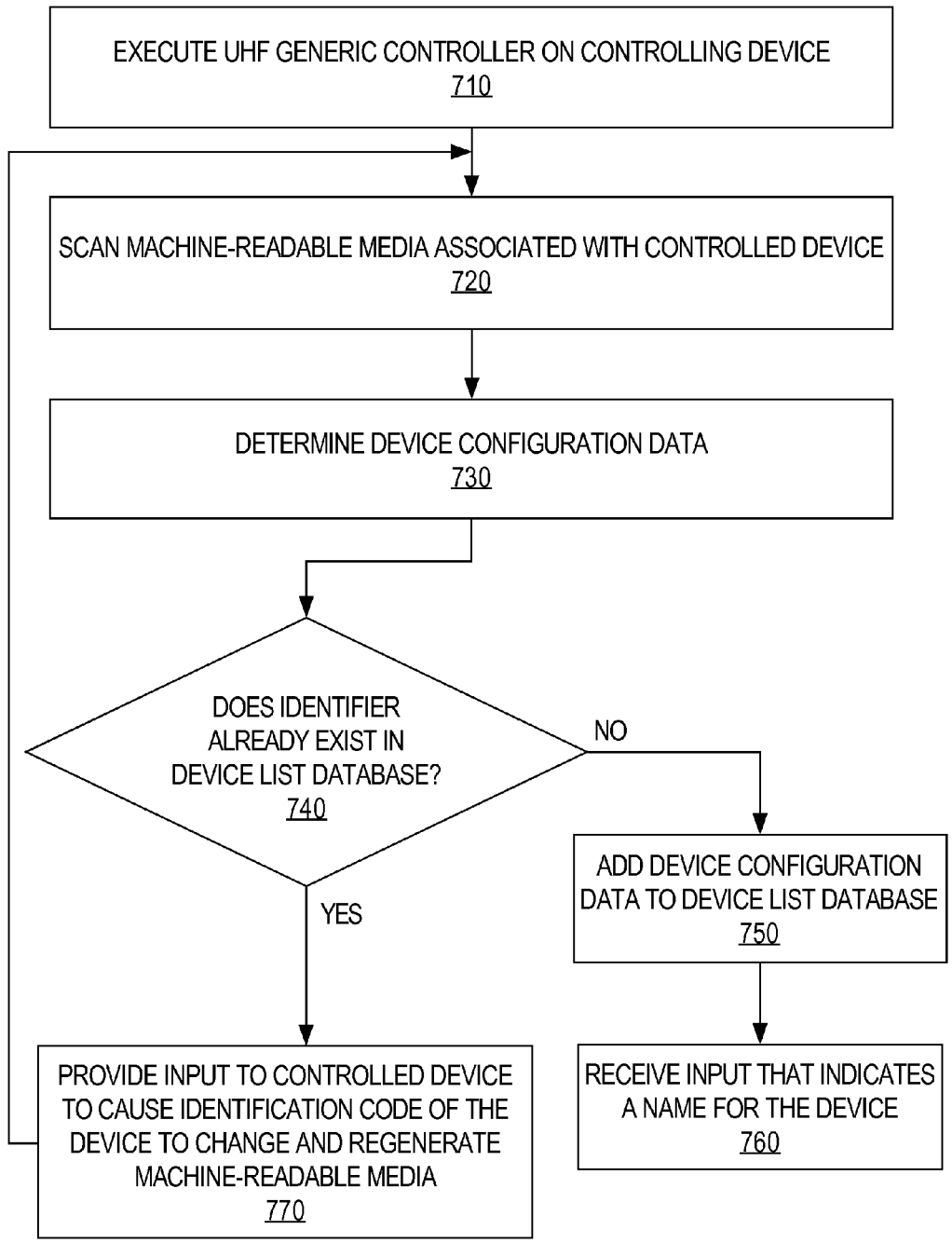
FIGS. 7A-B are flow diagrams that depicts a process for obtaining device configuration of a controlled device, according to an embodiment of the invention.

FIG. 7A is a flow diagram that depicts a process for obtaining device configuration of a UHF-enabled controlled device, according to an embodiment of the invention. FIG. 7A is described with reference to elements depicted in other figures, such as FIG. 2 and FIG. 4, wherein controlling device 220 and controlling device 400 are treated as the same device.

In step 710, UHF generic controller 420 executes on controlling device 220. This step may be performed in response to input that is received at controlling device 220 and that selects UHF generic controller 420.

In step 720, device configuration media 212 of controlled device 210 is scanned. As indicated herein, device configuration media 212 may be a printed label on which a two-dimensional barcode (e.g., QR code) is printed. The label may be on controlled device 210, on packaging of controlled device 210, or in a user manual of controlled device 210. Alternatively, device configuration media 212 may be a screen, of controlled device 210, on which the two-dimensional barcode or image is displayed. This step may be performed by UHF generic controller 420 causing camera 430 to generate one or more digital images of device configuration media 212.

For example, controlled device 210 may be a remote controllable light switch that includes a display, such as a LCD (liquid crystal display). The display may display an image that encodes the device configuration data of the remote controllable light switch. Thus, an image is not required to be (i.e., physically) printed, e.g., on the remote controllable light switch or on packaging of the remote controllable light switch.

In step 730, device configuration data is generated based on the image. This step may be performed by UHF generic controller 420 decoding data reflected on device configuration media 212, or rather reflected in one or more digital images of device configuration media 212.

In step 740, it is determined whether a device identifier in the device configuration data already exists in a database that lists each device controlled by controlling device 220 or by UHF generic controller 420. The database may be part of device configuration store 234 or may be separate from device configuration store 234. This step may be performed by UHF generic controller 420 comparing the device identifier of controlled device 210 with identifiers, of other controlled devices, stored in the database. Typically, two controlled devices with the same device identifier indicate that the two controlled devices operate using the same frequency. Thus, remote controller for either of the two controlled devices may be used to control both controlled devices. If the device identifier does not already exist in the database, then the process proceeds to step 750. Otherwise, the process proceeds to step 770.

In step 750, the device configuration data is added to the device list database. This step may be performed by UHF generic controller 420. Thereafter, if information that encodes the device configuration data of the same controlled device or another controlled device of the same type or model is scanned by controlling device 220, then the determination of step 740 when scanning that device configuration media will be positive and the process will proceed to step 770 without proceeding to step 750.

In step 760, input is received that indicates a name for controlled device 210. This name is stored in association with the device configuration data of controlled device 210. This step may be performed by UHF generic controller 420.

In step 770, a user provides input to controlled device 210 to cause an identification code of controlled device 210 to change and re-generate a new digital image (or series of images) that encodes the device configuration data of controlled device 210.

In the example described above where controlled device 210 is a remote controllable light switch with a (e.g., LCD) display, the input in step 770 may be user selection of an up button (whether graphical or physical) on the remote controllable light switch. In response to this input, the remote controllable light switch changes it identification code and re-generates a new image or series of images (e.g., that include a QR code) on the display, which may be rescanned by UHF generic controller 420. The re-generated image(s) will have new information encoded thereon, such as a new device identifier and a new frequency with which the remote controllable light switch communicates with one or more lights to switch them "on" or "off." If not, then a user attempting to control only one light with UHF generic controller 420 may inadvertently control multiple lights because multiple lights may be controlled at the same signal frequency. Thus, similar to walkie-talkies, a controlled device (such as a remote controllable light switch) may change (e.g., in response to user input) the frequency under which the controlled device operates.

IR Device Setup

Figure 7B:
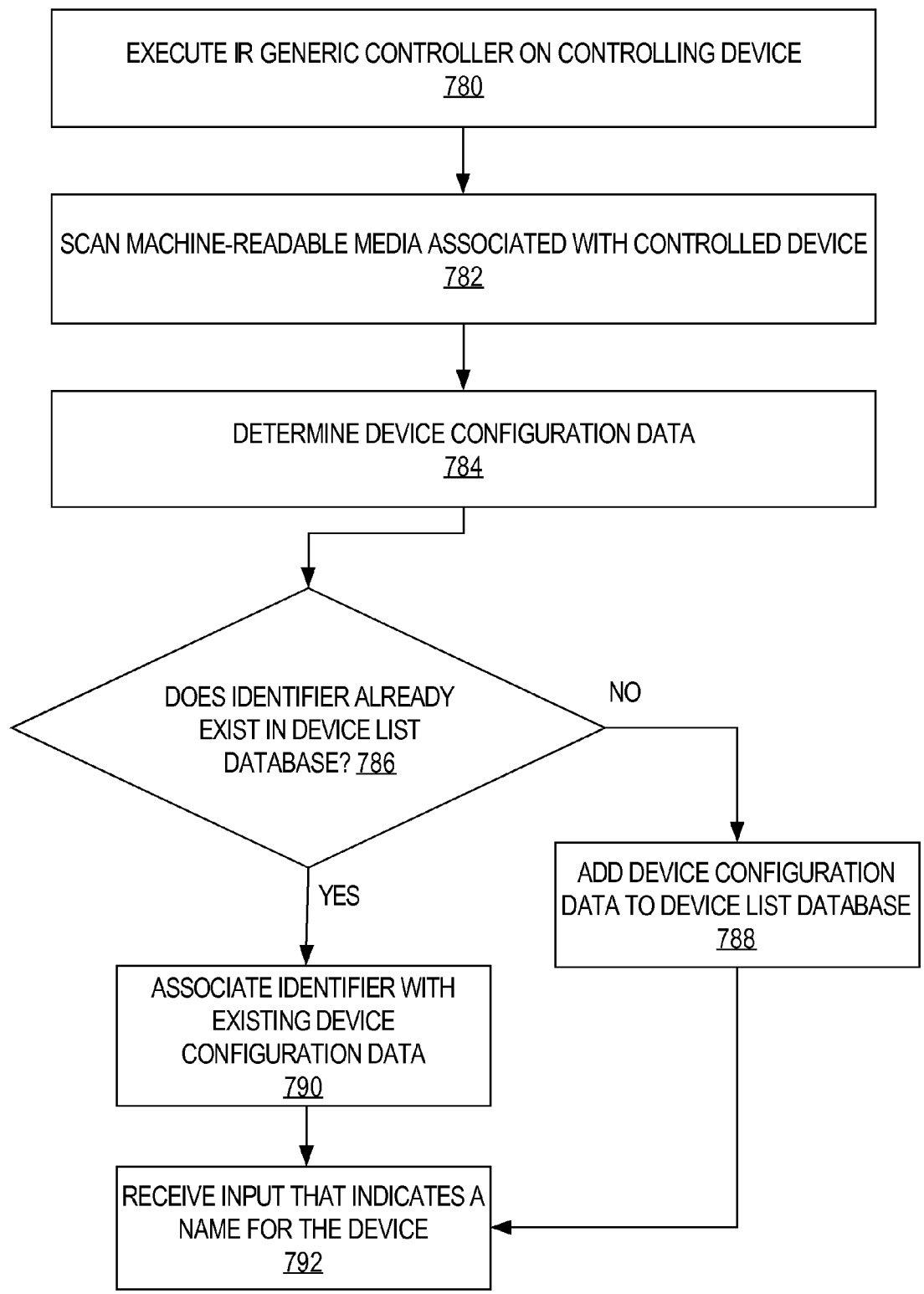

FIG. 7B is a flow diagram that depicts a process for obtaining device configuration of an IR controlled device, according to an embodiment of the invention. The process depicted in FIG. 7B is similar to the process depicted in FIG. 7A. One difference between FIGS. 7B and 7A is that in FIG. 7B, the controlled device is an IR device instead of a UHF device as in FIG. 7A. One reason for the difference is that a generic controller may control an IR device without worrying about inadvertently controlling other IR devices even though multiple IR devices may operate under the same frequency. Controlling multiple IR devices independently with the same frequency is possible due to the line-of-sight nature of IR signal transmissions. In other words, the IR transmitter on a controlling device must be pointed at or near the IR receiver of the controlled device when an IR signal is transmitted in order for the IR receiver to receive the IR signal. In contrast, the UHF transmitter on a controlling device is not required to be pointed at or near the UHF receiver of the controlled device in order for the UHF receiver to receive the UHF signal.

As in FIG. 7A, FIG. 7B is described with reference to elements depicted in other figures, such as FIG. 2 and FIG. 4.

In step 780, IR generic controller 410 executes on controlling device 220. This step may be performed in response to input that is received at controlling device 220 and that selects IR generic controller 410.

In step 782, device configuration media 212 of controlled device 210 is scanned. This step may be performed by IR generic controller 410 causing camera 430 to generate one or more digital images of device configuration media 212.

In step 784, device configuration data is generated based on an image printed, or displayed, on device configuration media 212. This step may be performed by IR generic controller 410 decoding data reflected in device configuration media 212, or rather reflected in one or more digital images of device configuration media 212.

In step 786, it is determined whether a device identifier in the device configuration data already exists in a database that lists each device controlled by controlling device 220 or by IR generic controller 410. The database may be part of device configuration store 234 or may be separate from device configuration store 234. This step may be performed by IR generic controller 410 comparing the device identifier of controlled device 210 with identifiers, of other controlled devices, stored in the database. If the device identifier does not already exist in the database, then the process proceeds to step 788. Otherwise, the process proceeds to step 790.

Step 786 may be performed before or after step 788. The determination performed in step 786 may indicate whether step 792 is required or optional. Alternatively, step 786 is not performed. Instead, the process proceeds from step 784 to step 788.

In step 788, the device configuration data is added to the device list database. This step may be performed by IR generic controller 410.

In step 790, the device identifier is associated with the existing device configuration data in the database that lists each controlled device.

In step 792, input is received that indicates a name for controlled device 210. This name is stored in association with the device configuration data of controlled device 210. This step may be performed by IR generic controller 410. If the determination of step 786 is positive, then step 792 may be required. Alternatively, a positive determination in step 786 may not be required, as long as IR generic controller 410 is able to display names of controlled devices that are unique relative to each other. For example, one TV may be named "TV1" and another TV may be named "TV2."

Generic Driver Installation

Figure 8:
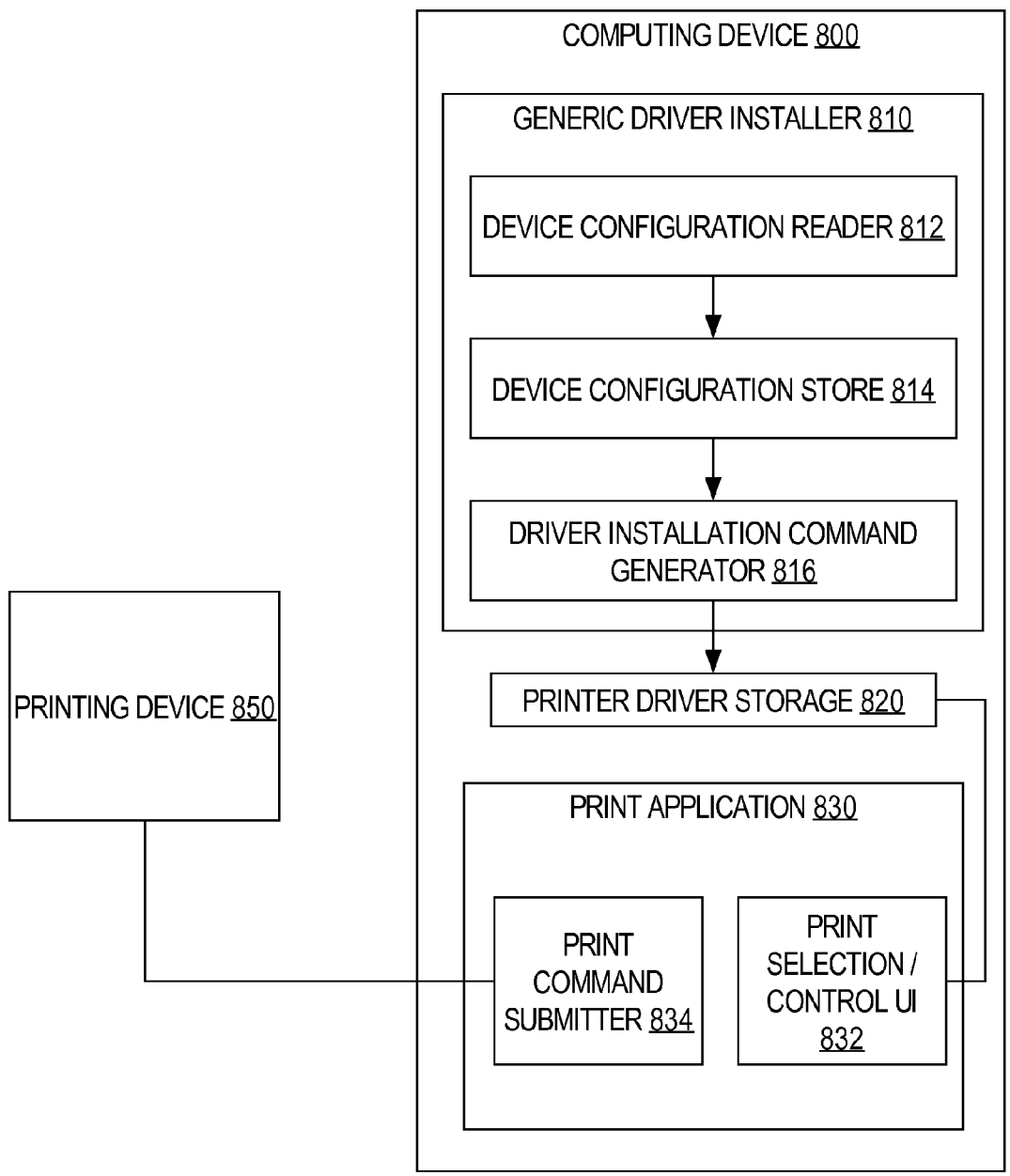
FIG. 8 is a block diagram that depicts a computing device that includes a generic driver installer, according to an embodiment of the invention.

FIG. 8 is a block diagram that depicts a computing device 800 that includes a generic driver installer 810, according to an embodiment of the invention. Computing device 800 may be a laptop computer, a tablet computer, or other handheld device, such as a smart phone. Computing device 800 may include a camera that is capable of taking a picture of an image that is, e.g., printed on a label on or near printing device 850 or, if printing device 850 includes a display (e.g., LCD), displayed on the display of printing device 850. Many current laptop computers come with built-in cameras that would be able to take pictures of images that are printed or displayed.

The image encodes enough information to install a printer driver for printing device 850. Instead of a single image, there may be a series of images that are displayed on the display of printing device 850 and scanned by computing device 800. In that scenario, the printer driver encoded in the series of images may be more sophisticated because of the amount of information that may be encoded on each image. Such a printer driver may include the capability to perform document conversion (e.g., converting a MS Word document to PostScript Printer Description (PPD) data).

In an alternative embodiment, the image(s) or the printer driver itself, may be transmitted to computing device 800 via a wired connection (e.g., using a USB port) or wirelessly (e.g., IR, Wi-Fi or UHF transmission).

Generic driver installer 810 comprises three components: a device configuration reader 812, a device configuration store 814, and a driver installation command generator 816. Embodiments of the invention are not limited to these components, nor to any particular implementation of these components. In all, generic driver installer 810 (and components thereof) may be implemented in hardware, software, or any combination of hardware or software.

Device configuration reader 812 analyzes one or more digital images of the machine-readable media to generate printing device configuration data for the printing device 850. Device configuration reader 812 stores the printing device configuration data in device configuration store 814. The printing device configuration data comprises data that indicates features (which may include capabilities) of printing device 850, such as whether printing device 850 supports duplex, can print in color, and includes a finisher, stapler, and/or hole puncher. The device configuration data may also indicate the paper sizes that printing device 850 supports, an IP address, and which protocol(s) (e.g., TCP or IP) may be used to communicate with printing device 850.

Driver installation command generator 816 generates, based on the printing device configuration data, a command that reflects all (or most) of the printing device configuration data. Driver installation command generator 816 sends the command to a printer driver storage 820 included in computing device 800. All the steps performed by reader 812 and generator 816 may be performed in response to a single input, such as the generation of one or more digital images of the machine-readable media (i.e., printed on or near printing device 850 or displayed on a screen of printing device 850) or user input, whether through a voice command or through the selection of a graphical element on a touch screen (not shown) of computing device 800.

Printer driver storage 820, which may be part of a printing subsystem of an operating system (not shown) of computing device 800. Printer driver storage 820 stores the features indicated in the command generated and sent by driver installation command generator 816.

Computing device 800 also includes a print application 830, such as a word processing application that includes an option to print one or more documents. Print application 830 includes a print selection/control user interface 832 and a print command submitter 834. In response to input to generate one or more printed documents that reflect electronic data, print selection/control UI 832 retrieves printing device data stored in printer driver storage 820. The retrieved printing device data is used to generate a user interface to be displayed on a display of computing device 800. A user may select, for example, duplex and color printing and A4 paper. Based on the selected features and the printing device data that indicates an IP address of printing device 850 and a communication protocol, print command submitter 834 sends a print command to printing device 850. Such a command may be sent, for example, via a WiFi connection or a hardwired network connection.

Many types of controlled devices (e.g., TV, DVD player, radio device, VCR) have fixed device configurations. In other words, such controlled devices do not change over time. In contrast, other types of devices, such as network printers, have dynamic configurations. For example, a network printer's IP address cannot be fixed at the time the network printer is manufactured. Instead, the network printer's IP address is assigned after deployment. As another example, over time, other features of a controlled device (e.g., printing device 850) may change. Specifically, printing device 850 may run out of A4 paper, no longer support duplex printing, may run out of color toner, may support an additional paper size, and/or may no longer have a functional finisher. Thus, printing device 850 may be configured to update its printing device configuration data to reflect the updates and encode the updated printing device configuration data in one or more images (e.g., of a two-dimensional barcode) that are printed or displayed. This new machine-readable media may then be displayed via a display of printing device 850. In this way, computing device 800 (or another computing device) may receive the most recent available printer driver for printing device 850.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
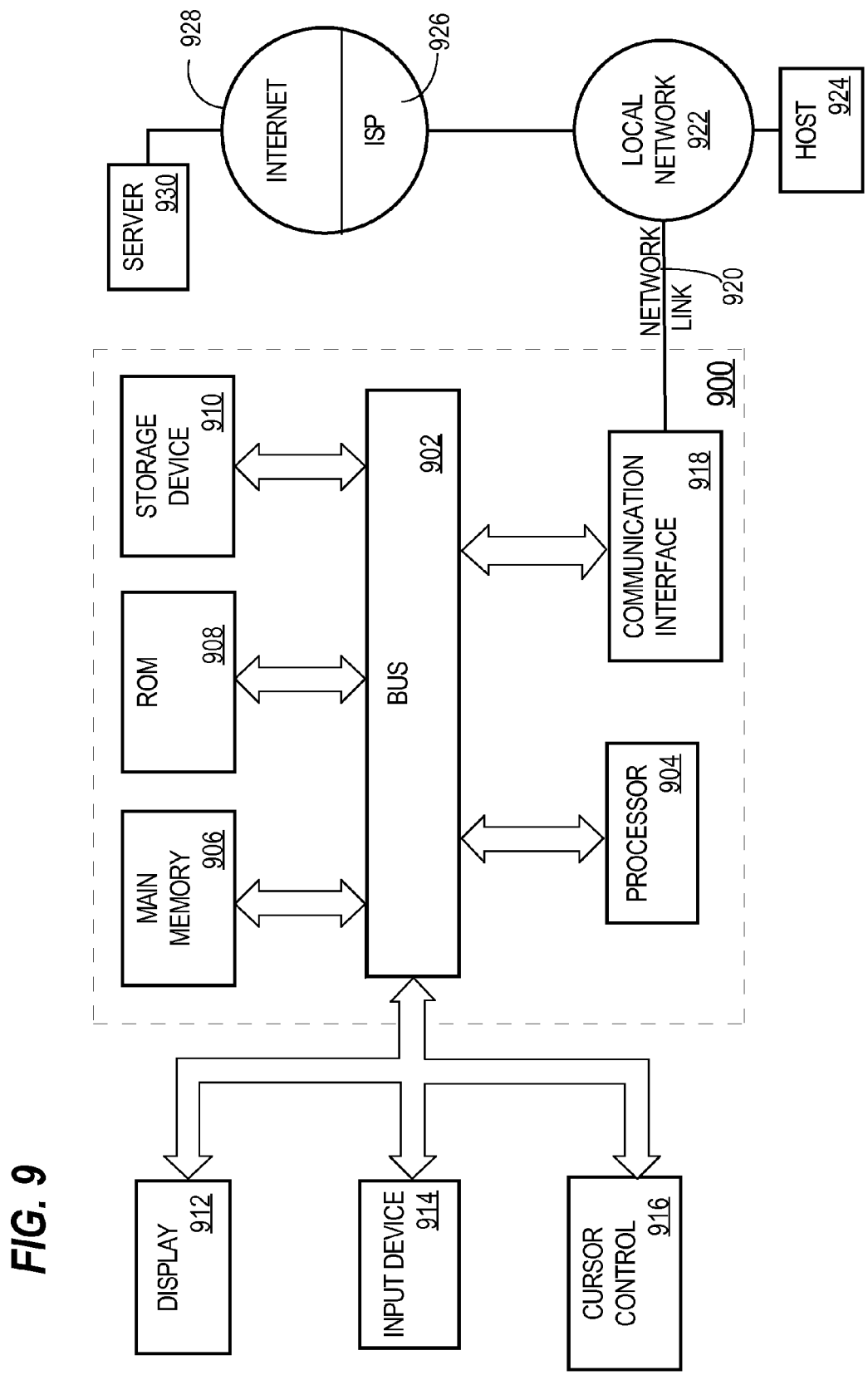
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more storage media storing instructions which, when executed by one or more processors, cause:
   analyzing, at a handheld controlling device, a first digital representation of data to determine a first device configuration data associated with a controlled device that supports a first plurality of features;
   wherein the first device configuration data indicates the first plurality of features and a first plurality of control codes;
   generating, based on the first device configuration data, a first plurality of user-selectable graphical elements, each of which corresponds to a different feature of the first plurality of features;
   after an event, that changes a configuration or feature of the controlled device, causes the controlled device to display a second digital representation of data that is different than the first digital representation of data, scanning the second digital representation of data to determine a second device configuration data associated with the controlled device;
wherein the second device configuration data indicates a second plurality of features and a second plurality of control codes;
generating, based on the second device configuration data, a second plurality of user-selectable graphical elements, each of which corresponds to a different feature of the second plurality of features;
displaying the second plurality of user-selectable graphical elements on a touch screen display of the handheld controlling device;
after generating the second plurality of user-selectable graphical elements based on the second device configuration data and displaying the second plurality of user-selectable graphical elements on the touch screen display of the handheld controlling device, receiving, through the touch screen display of the handheld controlling device, user input that selects a particular user-selectable graphical element of the second plurality of user-selectable graphical elements;
in response to receiving the user input:
identifying, based on a particular feature that corresponds to the particular user-selectable graphical element, a particular control code of the second plurality of control codes, and
sending the particular control code from the handheld controlling device to the controlled device.

2. The one or more storage media of claim 1, wherein:
the second device configuration data comprises a plurality of mappings;
each mapping of the plurality of mappings maps a feature of the second plurality of features to a control code for the feature; and
identifying the particular control code comprises:
identifying, based on the particular feature, a particular mapping, of the plurality of mappings, that corresponds to the particular feature, and
identifying, based on the particular mapping, the particular control code for the particular feature.

3. The one or more storage media of claim 1, wherein:
the second digital representation of data comprises a two-dimensional barcode.

4. The one or more storage media of claim 3, further comprising, prior to analyzing the first digital representation of data, generating, by a camera of the handheld controlling device, a digital image of the two-dimensional barcode.

5. The one or more storage media of claim 1, wherein analyzing the first digital representation of data to determine the first device configuration data comprises identifying a Uniform Resource Locator (URL) in the first digital representation of data and retrieving, from a source identified by the URL, the first device configuration data.

6. The one or more storage media of claim 1, wherein the handheld controlling device is a handheld device that includes telephony capabilities and a display for displaying graphical elements that correspond to at least a subset of the first plurality of features.

7. The one or more storage media of claim 1, wherein sending the particular control code to the controlled device comprises transmitting the particular control code via an infrared (IR) transmitter of the handheld controlling device or via an ultra high frequency (UHF) transmitter of the handheld controlling device.

8. The one or more storage media of claim 2, wherein the controlled device is a first controlled device, the instructions, when executed by the one or more processors, further cause, after sending the particular control code to the first controlled device:
analyzing, at the handheld controlling device, a third digital representation of data to determine third device configuration data associated with a second controlled device that supports a third plurality of features that are different than the first plurality of features;
wherein the second controlled device is different than the first controlled device;
storing, at the handheld controlling device, the third device configuration data separate from the first device configuration data;
wherein the third device configuration data indicates a second plurality of mappings;
each mapping of the second plurality of mappings maps a given feature of the third plurality of features to a control code for the given feature;
receiving, at the handheld controlling device, second user input that selects the second controlled device;
in response to receiving the second user input, generating, based on the second device configuration data, a second plurality of user-selectable graphical elements that is different in number from the first plurality of user-selectable graphical elements;
displaying the second plurality of user-selectable graphical elements on the touch screen display of the handheld controlling device;
after generating the second plurality of user-selectable graphical elements and displaying the second plurality of user-selectable graphical elements on the touch screen display of the handheld controlling device, receiving a third user input that selects a second particular user-selectable graphical element of the second plurality of user-selectable graphical elements;
in response to receiving the third user input:
identifying, based on a second feature that corresponds to the second particular user-selectable graphical element and a second mapping of the second plurality of mappings, a second control code, and
sending the second control code from the handheld controlling device to the second controlled device.

9. An apparatus comprising:
one or more processors;
one or more storage media storing instructions, which, when executed by the one or more processors, cause:
analyzing a first digital representation of data to determine a first device configuration data associated with a controlled device that supports a first plurality of features;
wherein the first device configuration data indicates the first plurality of features and a first plurality of control codes;
generating, based on the first device configuration data, a first plurality of user-selectable graphical elements, each of which corresponds to a different feature of the first plurality of features;
after an event, that changes a configuration or feature of the controlled device, causes the controlled device to display a second digital representation of data that is different than the first digital representation of data, scanning the second digital representation of data to determine a second device configuration data associated with the controlled device;
wherein the second device configuration data indicates a second plurality of features and a second plurality of control codes;

generating, based on the second device configuration data, a second plurality of user-selectable graphical elements, each of which corresponds to a different feature of the second plurality of features;

displaying the second plurality of user-selectable graphical elements on a touch screen display of the apparatus;

after generating the second plurality of user-selectable graphical elements based on the second device configuration data and displaying the second plurality of user-selectable graphical elements on the touch screen display, receiving, through the touch screen display of the apparatus, user input that selects a particular user-selectable graphical element of the second plurality of user-selectable graphical elements;

in response to receiving the user input:
identifying, based on a particular feature that corresponds to the particular user-selectable graphical element, a particular control code of the second plurality of controls codes, and sending the particular control code to the controlled device.

10. The apparatus of claim 9, wherein:
the second digital representation of data comprises a two-dimensional barcode.

11. The apparatus of claim 9, wherein analyzing the first digital representation of data to determine the first device configuration data comprises identifying a Uniform Resource Locator (URL) in the first digital representation of data and retrieving, from a source identified by the URL, the first device configuration data.

12. The apparatus of claim 9, wherein the apparatus is a handheld device that includes telephony capabilities and a display for displaying graphical elements that correspond to at least a subset of the first plurality of features.

13. The apparatus of claim 9, wherein sending the particular control code to the controlled device comprises transmitting the particular control code via an infrared (IR) transmitter of the apparatus or via an ultra high frequency (UHF) transmitter of the apparatus.

14. The apparatus of claim 9, wherein:
the second device configuration data comprises a plurality of mappings;
each mapping of the plurality of mappings maps a feature of the second plurality of features to a control code for the feature; and
identifying the particular control code comprises:
identifying, based on the particular feature, a particular mapping, of the plurality of mappings, that corresponds to the particular feature, and
identifying, based on the particular mapping, the particular control code for the particular feature.

15. The one or more storage media of claim 1, wherein:
analyzing the first digital representation of data to determine the first device configuration data comprises generating the first device configuration data based on analysis of the first digital representation of data;
the first device configuration data is encoded in the first digital representation of data.

16. The apparatus of claim 9, wherein:
analyzing the first digital representation of data to determine the first device configuration data comprises generating the first device configuration data based on analysis of the first digital representation of data;
the first device configuration data is encoded in the first digital representation of data.

17. The one or more storage media of claim 8, wherein:
the instructions, when executed by the one or more processors, further cause displaying, on the touch screen display of the handheld controlling device, a list of user-selectable options, each of which corresponds to a different controlled device of a plurality of controlled devices that includes the first controlled device and the second controlled device;
receiving the second user input that selects the second controlled device comprises receiving, through the touch screen display, input that selects, in the list, a user-selectable option that corresponds to the second controlled device.

18. The apparatus of claim 14, wherein:
the controlled device is a first controlled device, the instructions, when executed by the one or more processors, further cause, after sending the particular control code to the first controlled device:
analyzing, at the apparatus, a third digital representation of data encoded in to determine a third device configuration data associated with a second controlled device that supports a third plurality of features that are different than the first plurality of features;
wherein the second controlled device is different than the first controlled device;
storing, at the apparatus, the third device configuration data separate from the first device configuration data;
wherein the third device configuration data indicates a second plurality of mappings;
each mapping of the second plurality of mappings maps a given feature of the second plurality of features to a control code for the given feature;
receiving, at the apparatus, second user input that selects the second controlled device;
in response to receiving the second user input, generating, based on the third device configuration data, a second plurality of user-selectable graphical elements that is different in number from the first plurality of user-selectable graphical elements;
displaying the second plurality of user-selectable graphical elements on the touch screen display;
after generating the second plurality of user-selectable graphical elements and displaying the second plurality of user-selectable graphical elements on the touch screen display, receiving third input that selects a second particular user-selectable graphical element of the second plurality of user-selectable graphical elements;
in response to receiving the third input:
identifying, based on a second feature that corresponds to the second particular user-selectable graphical element and a second mapping of the plurality of mappings, a second control code, and
sending the second control code from the apparatus to the second controlled device.

19. The apparatus of claim 18, wherein:
the instructions, when executed by the one or more processors, further cause displaying, on the touch screen display, a list of user-selectable options, each of which corresponds to a different controlled device of a plurality of controlled devices that includes the first controlled device and the second controlled device;
receiving the second user input that selects the second controlled device comprises receiving, through the touch screen display, input that selects, in the list, a user-selectable option that corresponds to the second controlled device.

20. The one or more storage media storing instructions of claim 1, wherein at least one feature in the second plurality of features is not in the first plurality of features, or at least one control code in the second plurality of control codes is not in the first plurality of control codes.

21. The apparatus of claim 9, wherein at least one feature in the second plurality of features is not in the first plurality of features, or at least one control code in the second plurality of control codes is not in the first plurality of control codes.

22. One or more storage media storing instructions which, when executed by one or more processors, cause:
analyzing, at a handheld computing device, a digital representation of data to determine printing device configuration data associated with a printing device;
wherein the printing device configuration data indicates a plurality of features of the printing device;
generating, at the handheld computing device and based on the printing device configuration data, a command to install a printer driver associated with the printing device; and
causing the printer driver to be installed on the handheld computing device by submitting the command to a print driver storage of the handheld computing device;
wherein a print application, that is executing on the handheld computing device, retrieves, from the print driver storage, data about one or more features of the plurality of features and causes a print command to be sent to the printing device;
wherein the digital representation of data comprises a digital image displayed on a screen of the printing device;
wherein:
the digital image is a first digital image;
the plurality of features are a first plurality of features;
the printing device displays a second digital image on the screen of the printing device;
the second digital image encodes second printing device configuration data associated with the printing device;
the second printing device configuration data indicates, of the printing device, a second plurality of features that are different than the first plurality of features.

23. A handheld apparatus comprising:
one or more processors;
one or more storage media storing instructions which, when executed by the one or more processors, cause:
analyzing, at the handheld apparatus, a digital representation of data to determine printing device configuration data associated with a printing device;
wherein the printing device configuration data indicates a first plurality of features of the printing device;
generating, at the handheld apparatus and based on the printing device configuration data, a command to install a printer driver associated with the printing device; and
causing the printer driver to be installed on the handheld apparatus by submitting the command to a print driver storage of the handheld apparatus;
wherein a print application, that is executing on the handheld apparatus, retrieves, from the print driver storage, data about one or more features of the first plurality of features and causes a print command to be sent to the printing device;
wherein the digital representation of data comprises a digital image displayed on a screen of the printing device;
wherein the digital representation of data is a first digital representation of data displayed on the screen of the printing device;
wherein the one or more storage media store instructions which, when executed by one or more processors, further cause:
analyzing, at the handheld computing device, a second digital representation of data encoded to determine a second printing device configuration data associated with the printing device;
wherein the second printing device configuration data indicates, of the printing device, a second plurality of features that are different than the first plurality of features;
generating, at the handheld computing device and based on the second printing device configuration data, a second command to update the printer driver associated with the printing device; and
causing the printer driver to be updated on the handheld computing device by submitting the second command to the print driver storage of the handheld computing device.

* * * * *